(12) United States Patent
Cook

(10) Patent No.: US 9,835,869 B2
(45) Date of Patent: Dec. 5, 2017

(54) UNIVERSAL POLARIZATION CONVERTER

(71) Applicant: The United States, as represented by the Secretary of the Air Force, Washington, DC (US)

(72) Inventor: Gary Cook, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/452,941

(22) Filed: Mar. 8, 2017

(65) Prior Publication Data

US 2017/0176762 A1    Jun. 22, 2017

Related U.S. Application Data

(63) Continuation of application No. 14/934,271, filed on Nov. 6, 2015, now Pat. No. 9,778,475.

(60) Provisional application No. 62/075,958, filed on Nov. 6, 2014.

(51) Int. Cl.
  *G02B 27/28* (2006.01)
  *G02B 26/08* (2006.01)
  *G02B 5/30* (2006.01)

(52) U.S. Cl.
  CPC ......... *G02B 27/283* (2013.01); *G02B 5/3025* (2013.01); *G02B 5/3083* (2013.01); *G02B 26/0816* (2013.01)

(58) Field of Classification Search
  CPC .. G02B 27/286; G02B 5/3083; G02B 27/283; G02F 1/1335; G02F 1/133528; G02F 1/13353; G02F 1/13363; G02F 2001/133394; G02F 2001/133638
  USPC ............ 359/489.07, 489.08, 489.09, 489.15, 359/489.16, 490.01, 639, 640, 833, 834, 359/857, 861, 862; 356/364, 365, 491; 349/5, 8, 9, 96, 117, 119
  See application file for complete search history.

(56) References Cited

U.S. PATENT DOCUMENTS

| 5,102,222 A | 4/1992 | Berger et al. |
| 5,164,854 A | 11/1992 | Takanashi et al. |
| 5,579,420 A | 11/1996 | Fukeshima |
| 5,684,630 A | 11/1997 | Arai |

(Continued)

FOREIGN PATENT DOCUMENTS

| EP | 0584802 A1 | 3/1994 |
| EP | 0545389 B1 | 5/1997 |

(Continued)

*Primary Examiner* — Frank Font
(74) *Attorney, Agent, or Firm* — AFMCLO/JAZ; Charles Figer, Jr.

(57) ABSTRACT

A universal polarization converter is provided including a polarizer configured to receive unpolarized light. The polarizer is further configured to split the received unpolarized light into a first and second polarized state. At least two quarter wave phase retarders are configured to convert each of the first and second polarized states to opposite handed polarized beams. A cholesteric mirror is configured to combine the opposite handed polarized beams. In other embodiments, the cholesteric mirror may be replaced by a second polarizer and optional quarter wave retardation plate. Further embodiments may include a single polarization converter and multiple quarter wave retardation plates.

4 Claims, 10 Drawing Sheets

(56) References Cited

U.S. PATENT DOCUMENTS

| | | | |
|---|---|---|---|
| 5,734,447 A * | 3/1998 | Loiseaux | G03B 21/10 |
| | | | 348/E5.138 |
| 5,900,985 A | 5/1999 | Ho et al. | |
| 5,973,833 A | 10/1999 | Booth et al. | |
| 5,995,284 A | 11/1999 | Vanderwerf | |
| 6,038,054 A * | 3/2000 | Sakai | G02B 5/3016 |
| | | | 349/115 |
| 6,175,668 B1 | 1/2001 | Borrelli et al. | |
| 6,680,797 B2 | 1/2004 | Juday | |
| 7,387,391 B2 | 6/2008 | Domroese et al. | |
| 7,599,069 B2 | 10/2009 | Toussaint, Jr. et al. | |
| 8,611,008 B2 | 12/2013 | Jen | |
| 9,335,555 B1 | 5/2016 | Teng | |
| 2002/0176079 A1 | 11/2002 | Mueller | |
| 2004/0105150 A1 | 6/2004 | Yatsu et al. | |
| 2004/0165808 A1 | 8/2004 | Lauzon | |
| 2006/0193048 A1 | 8/2006 | Stark | |
| 2006/0268408 A1 | 11/2006 | Toussaint, Jr. et al. | |
| 2008/0088815 A1 | 4/2008 | Nomura | |
| 2009/0310207 A1 | 12/2009 | Maestle | |
| 2011/0262844 A1 | 10/2011 | Tabirian et al. | |
| 2012/0268718 A1 | 10/2012 | Kobayashi | |
| 2013/0010361 A1 | 1/2013 | Hsiung et al. | |
| 2014/0092373 A1 | 4/2014 | Tabirian et al. | |
| 2014/0204459 A1 | 7/2014 | Lu | |
| 2016/0109717 A1 | 4/2016 | Teng | |

FOREIGN PATENT DOCUMENTS

| | | |
|---|---|---|
| EP | 1130449 B1 | 8/2003 |
| EP | 1351015 A2 | 10/2003 |

* cited by examiner

UNIVERSAL POLARIZATION CONVERTER

CROSS-REFERENCE TO RELATED APPLICATIONS

This application is a continuation of U.S. application Ser. No. 14/934,271, entitled "Universal Polarization Converter," filed on Nov. 6, 2015, which claims the benefit of and priority to U.S. Provisional Application Ser. No. 62/075,958, entitled "Universal Polarization Converter," filed on Nov. 6, 2014, the entireties of which are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention relates to the conversion of the state of polarization of an optical beam.

Description of the Related Art

The state of polarization of an optical beam represents an important feature in many applications, in particular when measurements comprise polarization dependent components. Polarizers are typically inserted into the optical beam in order to provide a defined state of polarization. While optical signals with defined states of polarization will pass the polarizer, optical signals with other states of polarization will generally be absorbed or reflected. Disadvantageous in that solution, however, is that the optical power of the output beam after the polarizer can be significantly decreased with respect to the input beam. Further, the optical power of the output beam becomes a function of the state of polarization of the input beam.

Malus' law originates from the French scientist and mathematician Étienne-Louis Malus (23 Jul. 1775-24 Feb. 1812). The law states that the transmission of polarized light through a polarizer varies as the square of the cosine of the angle of the polarizer with respect to the light input polarization vector.

$$I = I_0 \cos^2 \theta_i \quad (1)$$

where $I_0$ is the initial intensity, and $\theta_i$ is the angle between the light's initial polarization direction and the axis of the polarizer. Unpolarized light consists of the superposition of all possible polarization states. The average transmission of unpolarized light through a polarizer is therefore the average of all possible cosine squared values, which equals one half, or 50% transmission, thus the transmission coefficient becomes $$\frac{I}{I_0} = \frac{1}{2}. \quad (2)$$

In practice, some light is lost in the polarizer and the actual transmission of unpolarized light will be somewhat lower than this, around 38% for Polaroid-type polarizers but considerably higher (>49.9%) for some birefringent prism types. If two polarizers are placed one after another (the second polarizer is generally called an analyzer), the mutual angle between their polarizing axes gives the value of θ in Malus' law. If the two axes are orthogonal, the polarizers are crossed and in theory no light is transmitted, though again practically speaking no polarizer is perfect and the transmission is not exactly zero.

Accordingly, there is a need in the art for a polarizer that improves the optical power of the output beam.

SUMMARY OF THE INVENTION

Embodiments of the invention propose a novel way of converting unpolarized light into pure polarized light of any kind with 100% conversion efficiency. This method breaks the physics Law of Malus which states that the maximum conversion efficiency of unpolarized light into polarized form cannot exceed 50%. Being able to achieve close to 100% conversion enables the size of polarization sensitive optical systems to be dramatically reduced, saving weight and cost. The potential applications for such a device are numerous and include, for example, laser polarization conversion, coherent beam combination, sensor enhancement, TV and LCD brightness improvement, Wavelength Division Multiplexer (WDM) loss reduction, optical switches, optical filters, optical and laser sensor protection, LIDAR sources, RADAR sources, and improved antenna designs.

In one exemplary embodiment of the invention, a universal polarization converter includes a polarizer configured to receive unpolarized light. The polarizer is further configured to split the received unpolarized light into a first and second polarized state. At least two quarter wave phase retarders are configured to convert each of the first and second polarized states to opposite handed polarized beams. A cholesteric mirror is configured to combine the opposite handed polarized beams resulting in a near 100% conversion of the received unpolarized light.

In another exemplary embodiment of the invention, the universal polarization converter includes a first polarizer configured to receive unpolarized light. The polarizer is further configured to split the received unpolarized light in to a first and second polarized state. A second polarizer is configured to combine the first and second polarized states into a collinear beam. A quarter wave retardation plate is configured to receive the collinear beam and cover the collinear beam into right and left handed circularly polarized light, which can then be added to produce a near 100% conversion of the received unpolarized light.

In yet another exemplary embodiment of the invention, the universal polarization converter includes a polarizer configured to receive unpolarized light. A first quarter waveplate is proximate to the polarizer. A first mirror is proximate to the first quarter waveplate resulting in the first quarter waveplate being between the polarizer and the first mirror. A second quarter waveplate is proximate to the polarizer and opposite the first quarter waveplate. A second mirror is proximate to the second quarter waveplate resulting in the second quarter waveplate being between the polarizer and the second mirror. A third quarter waveplate is proximate to the polarizer and orthogonal to the first and second quarter waveplates. A first polarized component is transmitted directly through the converter while a second polarized component follows a zigzag path through the converter.

In yet another exemplary embodiment of the invention, the universal polarization converter includes a first cycloidal waveplate configured to receive unpolarized light and further configured to split the unpolarized light into two oppositely handed circularly polarized beams. A second, reversed, cycloidal waveplate is located proximate to the first cycloidal waveplate and is configured to re-collimate the two oppositely handed circularly polarized beams yielding two superimposed oppositely handed circularly polarized beams.

Additional objects, advantages, and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention propose a novel way of converting ordinary unpolarized or randomly polarized light into pure polarized light of any kind with near 100% conversion efficiency. This method breaks the physics Law of Malus which states that the maximum conversion efficiency of unpolarized light into polarized form cannot exceed 50%. Being able to achieve close to 100% conversion enables the size of polarization sensitive optical systems to be dramatically reduced, saving weight and cost. The applications for such a device are numerous and include, for example, laser polarization conversion, coherent beam combination, sensor enhancement, TV and LCD brightness improvement, Wavelength Division Multiplexer (WDM) loss reduction, optical switches, optical filters, optical and laser sensor protection, LIDAR sources, RADAR sources, and improved antenna designs.

Figure 1:
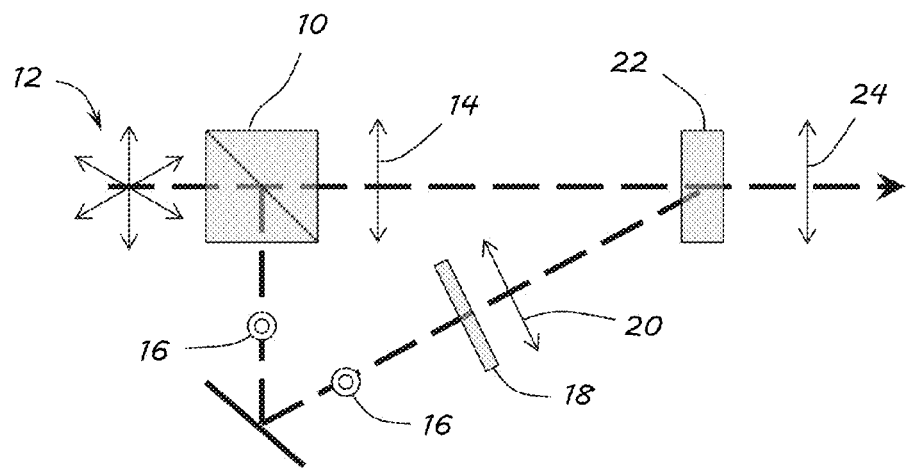
FIG. 1 is a schematic diagram illustrating prior art polarization conversion using photorefractives.

Photorefractives have the possibility of exceeding the 50% Law of Malus conversion efficiency limit, as shown in FIG. 1. The configuration in FIG. 1 relies on a polarizer 10 dividing an unpolarized beam 12 into two beams, p and s polarized 14, 16. One of the beams, the s-polarized light 16, is then passed through a half wave plate 18 to convert it back into p-polarized light 20. The two resulting beams p-polarized beams 14, 20 cannot be simply re-combined using either another polarizer or beam splitter as the resulting power in any one direction will not exceed 50% of the original unpolarized light power, enforcing the Law of Malus. However, if the two p-polarized light beams are used to create an interference pattern in a photorefractive material 22, then unidirectional power transfer can result in a single polarized beam 24 with greater than 50% of the original power. Unfortunately, although others have explored this method already, the technique cannot yield close to 100% conversion owing to the necessary absorption of light in the photorefractive material 22. It is also possible to replace the photorefractive material with a passive volume Bragg grating, but the use of a photorefractive material 22 ensures that beam coupling will always be in one direction. Both methods are purely coherent processes, and so they can only be used with long coherence sources such as lasers. These deficiencies make the system very unattractive for practical use, especially with high power lasers.

Figure 2:
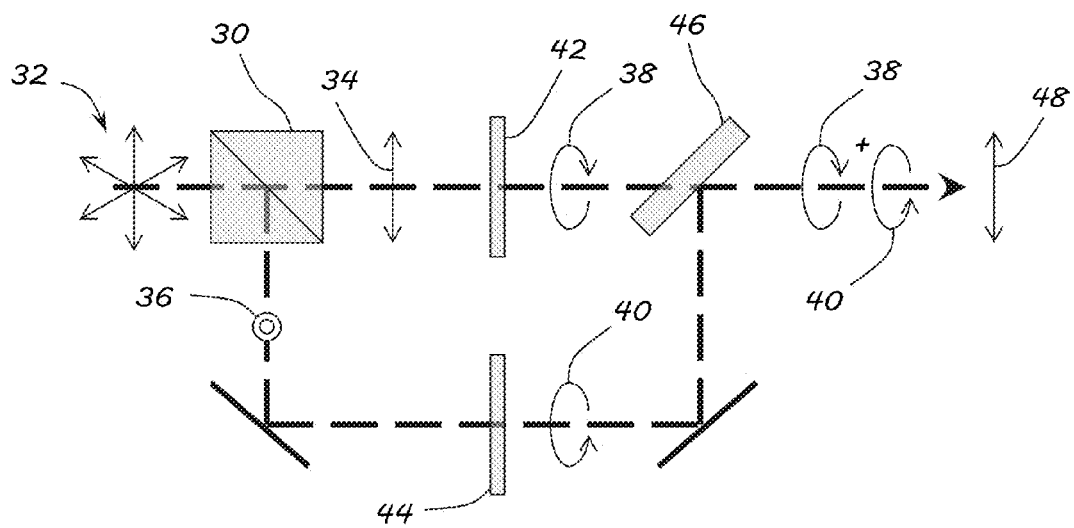
FIG. 2 is a schematic diagram illustrating polarization conversion using a cholesteric mirror.

Although the Law of Malus seems impossible to circumvent using ordinary polarization optics or beam splitters and mirrors, careful use of cholesteric mirrors or phase retarders can be used to create schemes where complete conversion is actually possible. One embodiment of the invention, which uses a cholesteric mirror, is shown in FIG. 2. In this embodiment, a conventional polarizer 30 splits the unpolarized light 32 into p and s-polarization states 34, 36. Both beams are then converted to circularly polarized light 38, 40 with opposite handedness using quarter wave phase retarders 42, 44. In some embodiments the wave phase retarders can be wave plates or in other embodiments the wave phase retarders may be Fresnel rhombs. The two opposite handedness polarized beams 38, 40 are then recombined using a cholesteric mirror 46. The cholesteric mirror 46 uses cholesteric liquid crystals, or a structured surface, such that it reflects circularly polarized light of only one handedness. Light of the opposite handedness is transmitted without loss. The recombined beam 48 now comprises two superimposed oppositely handed circularly polarized states 38, 40. Providing the amplitudes of both beams are the same, electric field addition between these two states results in a single linearly polarized state with a linear polarization vector which is determined by the phase difference between the left and right handed circularly polarized beam paths. Simply adjusting the physical path length between the two circularly polarized beams allows complete control of the polarization vector for the final linearly polarized beam.

Figure 3:
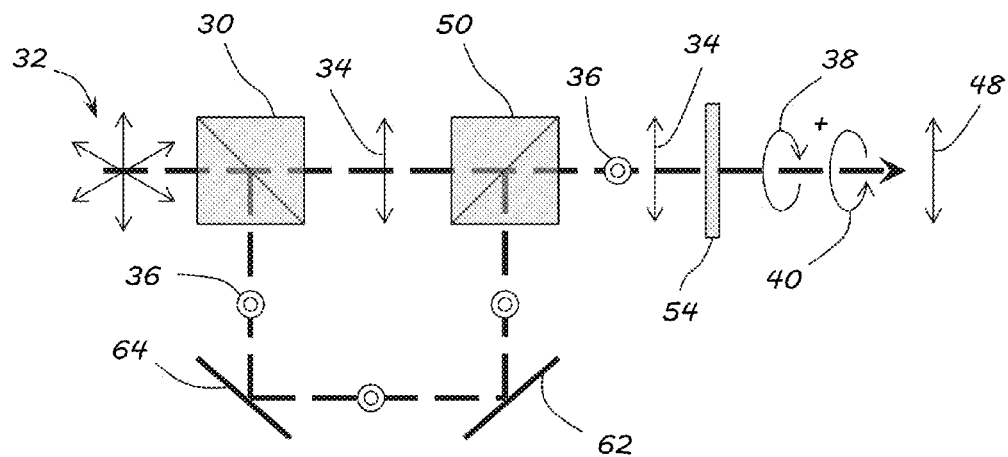
FIG. 3 is a schematic diagram illustrating polarization conversion using only polarization optics.

Although the embodiment illustrated in FIG. 2 can achieve near 100% conversion of unpolarized light into polarized light, the reliance on cholesteric mirrors naturally restricts the bandwidth of the system to that of the reflective properties of the mirror. For most liquid crystal based cholesteric mirrors this bandwidth rarely exceeds 100 nm, and is only a tiny fraction of this bandwidth for surface structured analogues. However, by replacing the cholesteric mirror with a polarizer and quarter waveplate combination, the operational bandwidth may be extended to include any desired wavelength, as shown in the embodiment in FIG. 3. In this embodiment, the second polarizer 50 recombines the s and p linearly polarized beams 34, 36 into a single collinear beam. This beam then pass through a common quarter wave retardation plate 54 (waveplate or Fresnel rhomb). Owing to the orthogonal states of the s and p polarization vectors 34, 36, the quarter wave retarder 54 converts the s-polarized state of the collinear beam into right-hand circularly polarized light 40 and the p-polarized state of the collinear beam into left-hand circularly polarized light 38, or vice versa. For equal beam intensities, field addition between the two transmitted oppositely handed circularly polarized states results in a single linearly polarized beam. Just as with the cholesteric variant of this device, the exit polarization vector 48 may be controlled simply by adjusting the optical path length difference between the s and p polarized constituent beams 34, 36.

Figure 4:
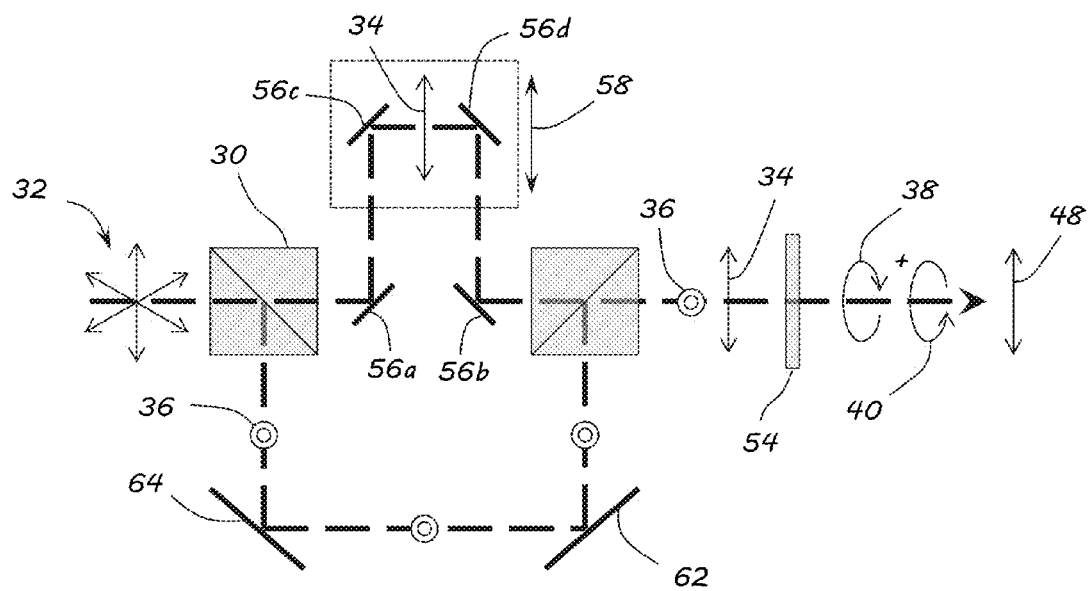
FIG. 4 is a schematic diagram of an alternate embodiment illustrating polarization conversion using only polarization optics.

One method of adjusting the path length difference between the s and p polarized constituent beams 34, 36 is illustrated in the embodiment in FIG. 4. The addition of mirrors 56a-d allow for adjustments to the optical path length of p 34 keeping the optical path length for s 36 constant. By moving mirrors 56c and 56d in the direction of the arrow 58 provides the ability to lengthen or shorten the optical path length of p 34 and thus ultimately adjusting the path length difference between p and s 34, 36. In an alternate embodiment illustrated in FIG. 5, the optical path length of s 36 may be adjusted with a drive element such as drive element 60. In this embodiment, the drive element may be equipped for fine translational movement of the mirror 62. Other configurations of this embodiment may also include a second drive element to adjust the movement of mirror 64 independently or simultaneously. In a specific configuration for the embodiment in FIG. 5, fine control of the path length differences may be achieved using a piezoelectric drive element 60 to actuate mirror 62. Fine control may be used to determine an orientation of the final polarization state. An electric feedback loop control may also be used in some embodiments to "lock" the output 54 to a desired state and orientation. Alternately, in some embodiments employing a piezoelectric drive element, if the drive element is driven with a sinusoidal input, the resulting output from the system may be in the form of pulses.

Figure 5:
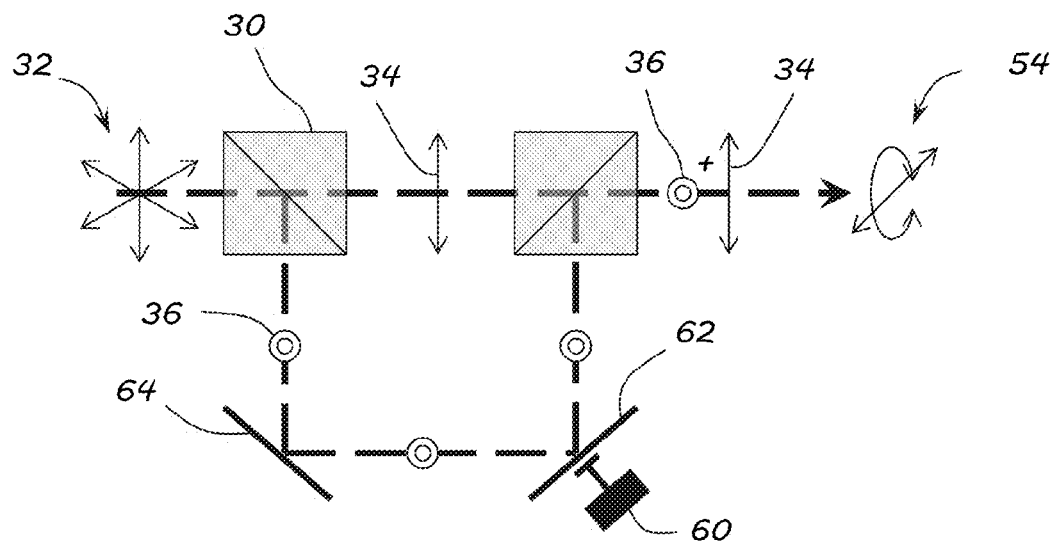
FIG. 5 is a schematic diagram of another alternate embodiment illustrating polarization conversion using only polarization optics.

Alternatively, and as also illustrated in FIG. 5, the quarter wave plate 54 illustrated in FIG. 4 is removed. The resulting output 54 from the interference of the orthogonal fields may result in linearly polarized outputs in a ±45° orientation, elliptically polarized outputs in a ±45° orientation, or left or right handed circularly polarized outputs depending on the order and relative lengths of the optical paths of p and s 34, 36.

Figure 6:
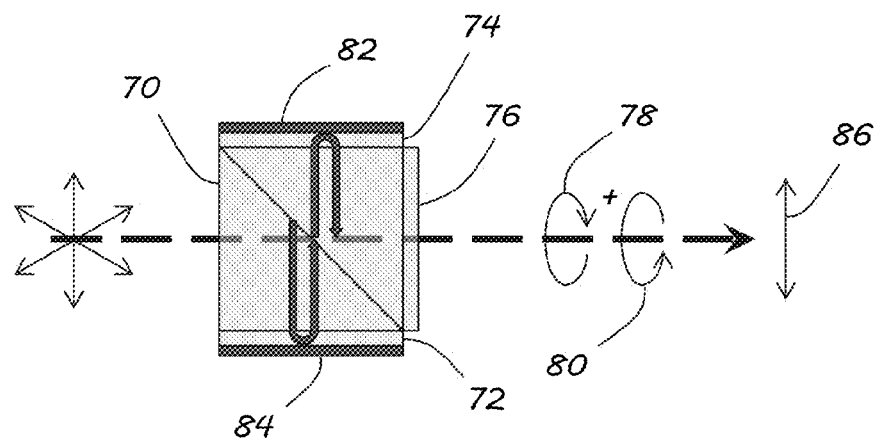
FIG. 6 is a schematic diagram illustrating a monoblock super compact polarization converter.

The embodiments described above in FIGS. 3-5 have been successfully demonstrated; however, the required optics tend to be rather bulky and cumbersome. As an alternative, and in an alternate embodiment, it is possible to design a simple, single "mono-block" device to accomplish the same performance using a compact configuration illustrated in FIG. 6. In this configuration, a single polarizer 70 may be used in conjunction with three quarter wave plates 72, 74, 76. The p-polarized component is transmitted directly through the device and emerges as circularly polarized light 78 after the last waveplate 76. The s-polarized component follows a zigzag path through the other two wave plates 72, 72 and mirror reflections 82, 84 and emerges superimposed as oppositely handed circularly polarized light 80 after the last waveplate 76. This design is extremely compact and robust, especially as the wave plates 72, 74, 76 may be optically bonded to the polarizer 70 and the mirror coatings deposited directly onto the external faces of the first two wave plates 72, 74. An additional refinement may also be possible by inserting a piezoelectric or electro-optic element between one or both of the mirrors 82, 84, in some embodiments so that the optical path length can be controlled simply by the application of an electric field. Electronic feedback may also be used with these embodiments to automatically "lock" the exit polarization vector into a predetermined state.

The devices shown in FIGS. 2-6 are all designed to work with unpolarized light. It may be desirable to enable the same devices to function properly with a polarized input or with randomly polarized light. Good examples for this would be for converting a randomly polarized laser into a polarized laser, or for ensuring perfect polarization conversion into a known state without needing to know the input polarization state. In the latter situation, adding a depolarizer (not shown) immediately before the input polarizer enables light of any polarization state to work with these devices. Without the expedient of using a pre-depolarizer, it is possible that the input light polarization split power ratio may not be equal, resulting in an elliptically polarized output from the system. Adding a depolarizer will not affect the device performance for an unpolarized input, making the device universally suitable for all light sources. If desired, a regular waveplate can be placed at the system exit to control the transmitted polarization conventionally (without loss), negating the need to adjust the local optical path lengths between the constituent beams. This method may also be appropriate whenever an elliptically polarized output is desired. In all of the embodiments illustrated in FIGS. 2-6, near 100% conversion from the input light into a desired output polarization occurs.

Figure 7:
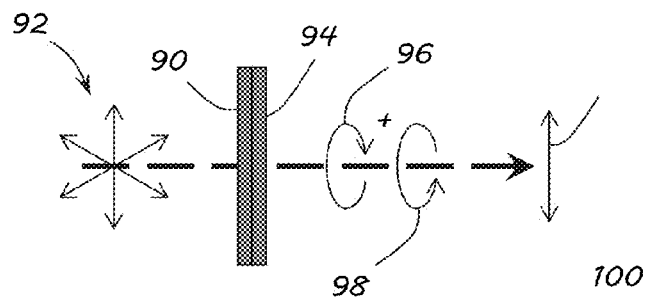
FIG. 7 is a schematic diagram illustrating a cycloidal waveplate super compact 100% polarization converter.

Other embodiments may utilize cycloidal waveplates. These waveplates are usually based on liquid crystal designs and are emerging as a promising potential source of polarization control. In these devices, the birefringent axis of the material spirals, or "cart-wheels" in the plane of the device so that the birefringence cycles periodically across the device aperture. In principle, these devices do not require an input polarizer and can be used directly with linearly polarized or unpolarized light. As illustrated in FIG. 7, a single cycloidal waveplate 90 splits an unpolarized input beam 22 into two oppositely handed circularly polarized beams, with a diffraction angle the same as would be created by a conventional diffraction grating with a pitch spacing equivalent to the cycloidal pitch spacing. Adding a second reversed cycloidal waveplate 94 re-collimates the beams to yield two superimposed oppositely handed circularly polarized beams 96, 98, which will add together to create a single linearly polarized state 100. A present challenge is the creation of cycloidal waveplates in materials other than liquid crystals, to improve power handling, temperature sensitivity and to enable the two cycloidal surfaces to be placed in direct contact for minimal overlap loss.

Figure 8:
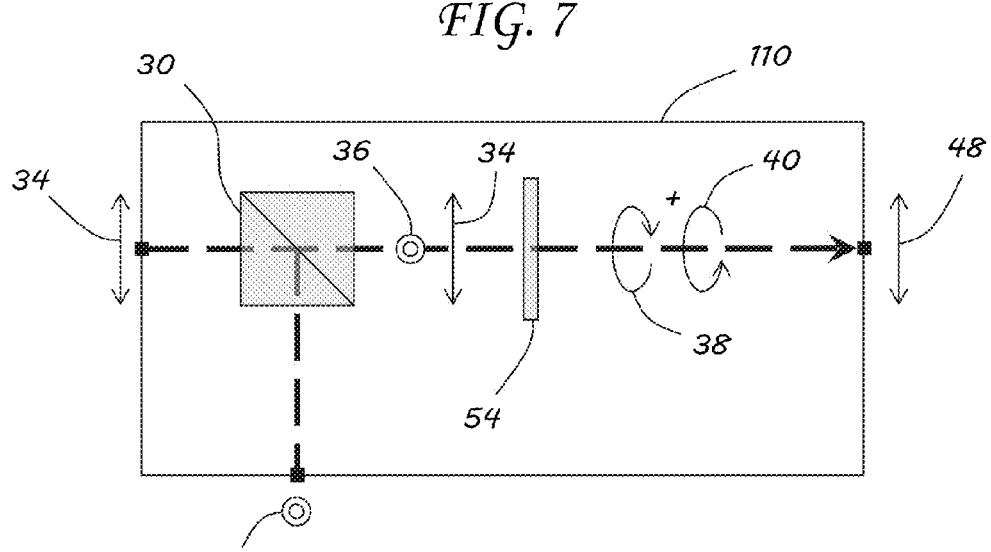
FIG. 8 is a schematic diagram illustrating a coherent combination of two laser amplifiers.

The embodiments set forth above for converting unpolarized light into polarized light may also be used to coherently combine a multitude of laser amplifiers into a single coherent beam. This might be useful for many systems, especially with emerging high power fiber lasers. An exemplary embodiment for coherent combination is illustrated in FIG. 8. Unlike conventional phase control coherent combination devices, the configuration 110 shown in FIG. 8 does not produce any amplitude fluctuations in the output beam arising from phase variations between the two amplifier paths. Phase fluctuations produce only changes in the output polarization direction, and not in the power of the output beam. Phase control of the amplifier beam paths can be used to control the linear polarization direction of the output, if required, or a half waveplate can be used to adjust the output polarization direction as desired.

Figure 9:
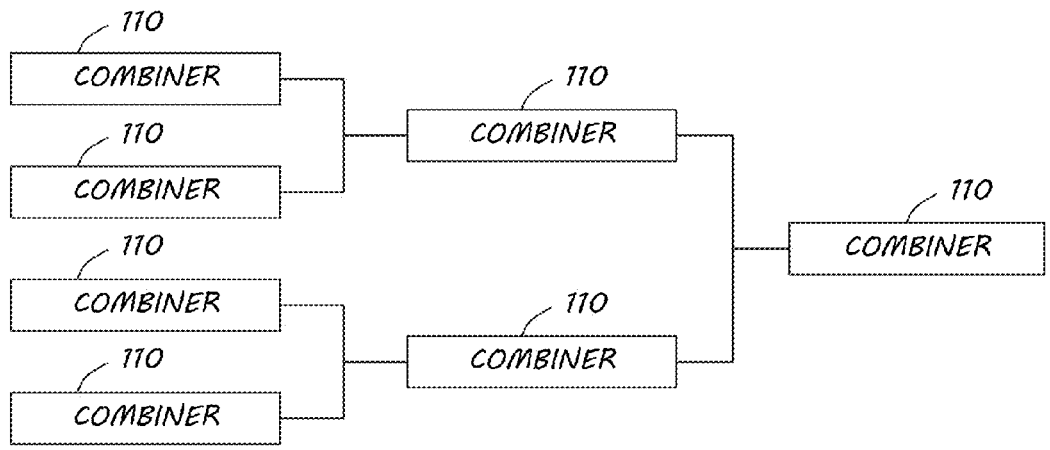
FIG. 9 is a block diagram illustrating coherent combination of multiple laser amplifiers.

The device shown in FIG. 8 is suitable for coherently combining two laser amplifiers. However, the same scheme may be extended to combine a multiplicity of amplifier pairs as shown in FIG. 9. In this arrangement, pairs of laser amplifiers are progressively coherently combined to generate a single coherent output. In this way, 2, 6, 14, 30, etc. laser amplifiers may be coherently combined.

Figure 10:
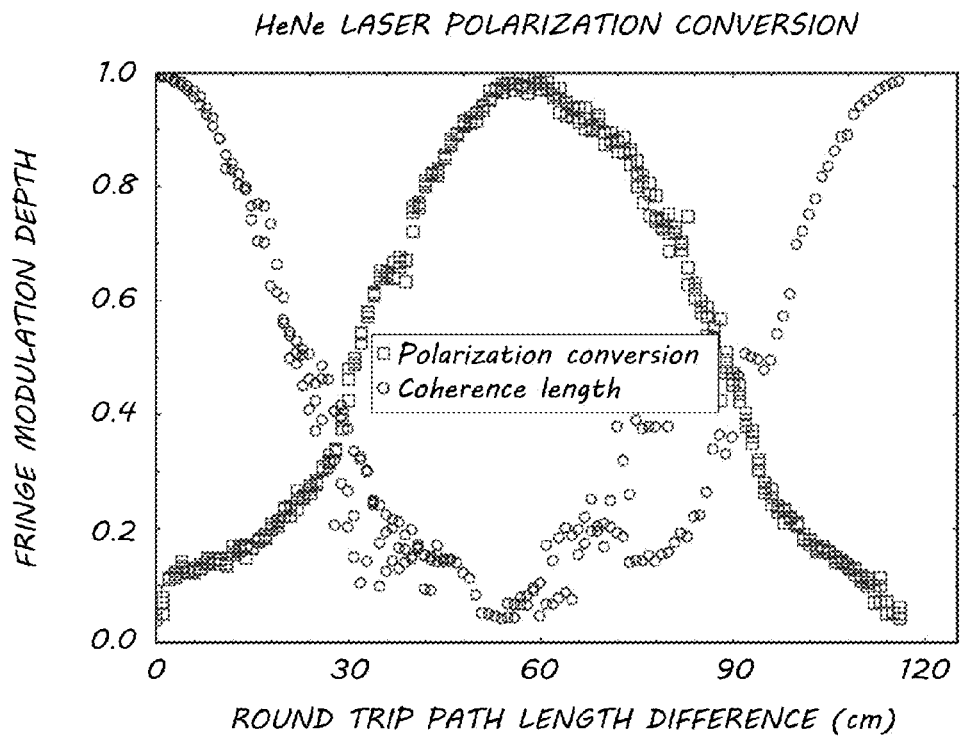
FIG. 10 is a graph Fringe Modulation Depth v. Path Length Difference for a HeNe Laser.
Figure 11:
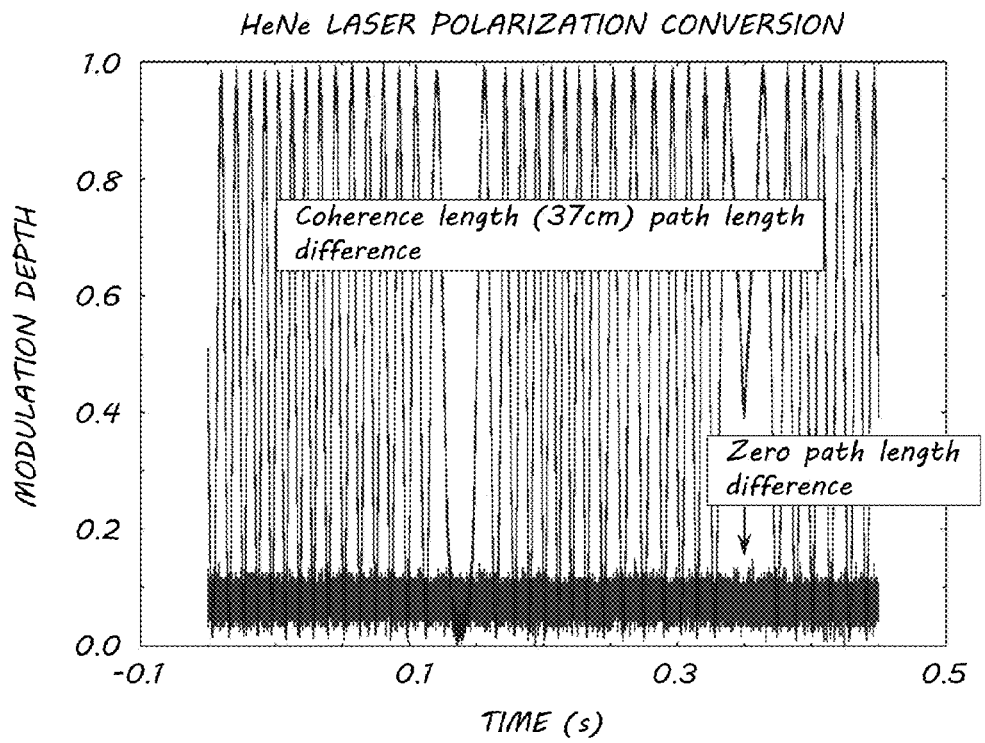
FIG. 11 is a graph of Modulation Depth v. Time for a HeNe Laser.

Embodiments of the invention, including control of the exit polarization vector through path length control of the s-polarized beam path, has been successfully demonstrated in the laboratory using an unpolarized helium neon laser, resulting in close to 100% conversion into linearly polarized light, limited only by small reflection losses in the components. Results of the helium neon laser polarization conversion can be seen in FIGS. 10 and 11. Near 100% conversion of unpolarized light into polarized light was achieved as evidenced by the graphs in FIGS. 10 and 11. The graph in FIG. 11 shows actual modulation obtained through an analyzer by vibrating one of the mirrors (62, 64). For this specific embodiment, a path length difference equivalent to the laser source resonator length was introduced between the s and p polarization paths using the configuration shown in FIG. 4. This allowed phase compensation between adjacent longitudinal modes for efficient polarization conversion. This expedient is only necessary for certain laser sources with defined longitudinal modes in which there is orthogonality between the local polarization states of adjacent mode pairs. When this situation does not exist, a zero path length difference is generally required. This serves to illustrate the benefit of the configuration shown in FIG. 4 which can be adapted to match most optical sources according to the presence, or absence, of longitudinal mode structure.

Figure 12:
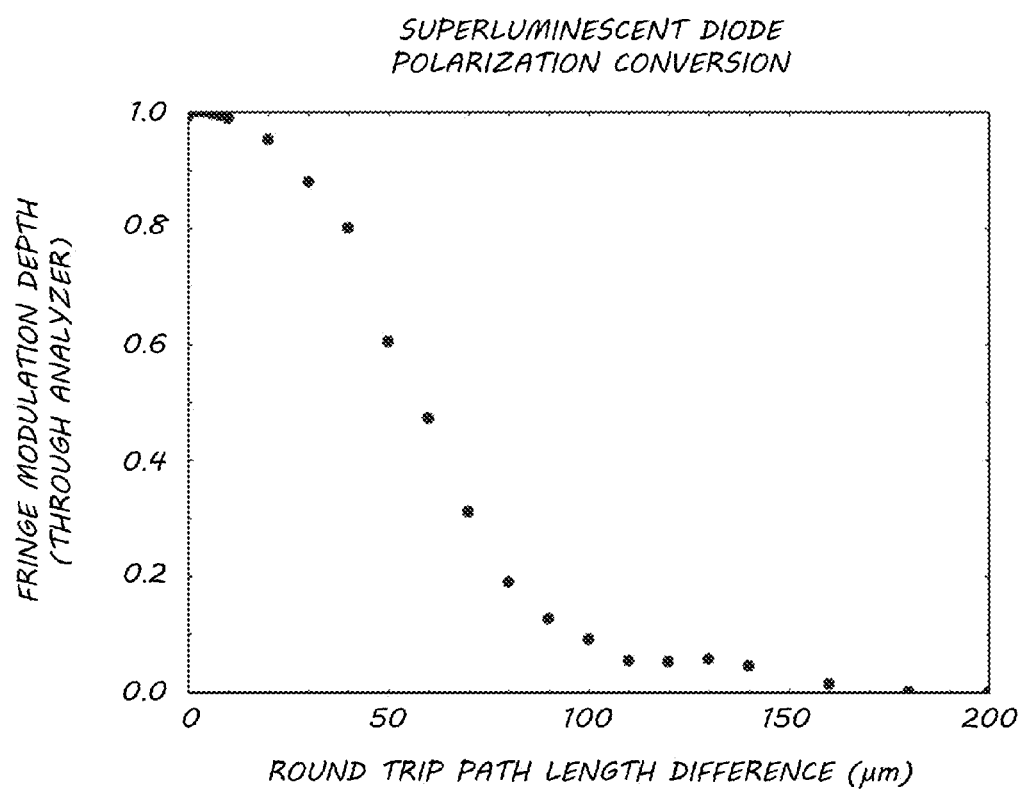
FIG. 12 is a graph of Fringe Modulation Depth v. Path Length Difference for a Superluminescent Diode.
Figure 13:
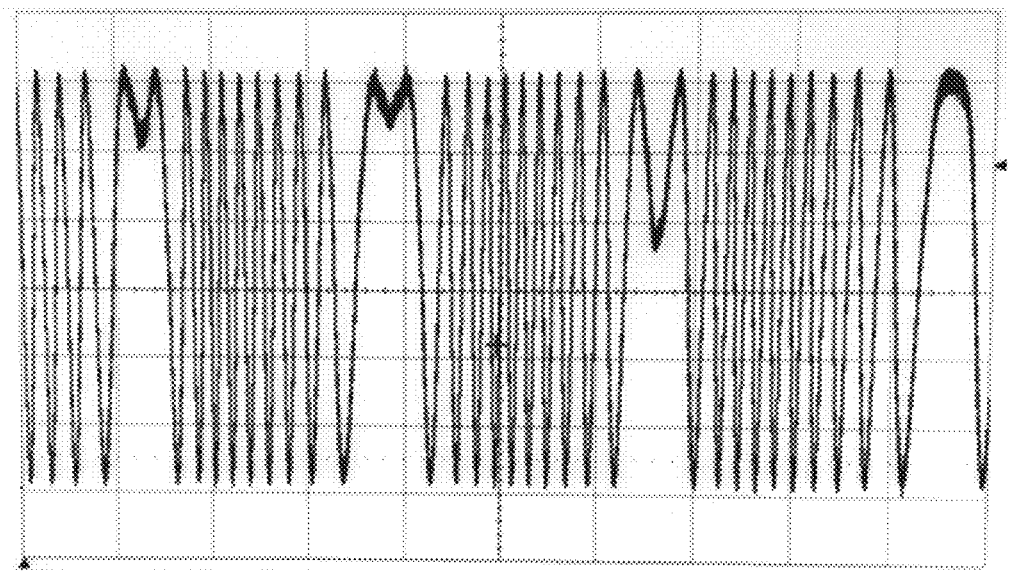
FIG. 13 is a screen reproduction of a response from a Superluminescent fiber coupled diode.
Figure 13A:
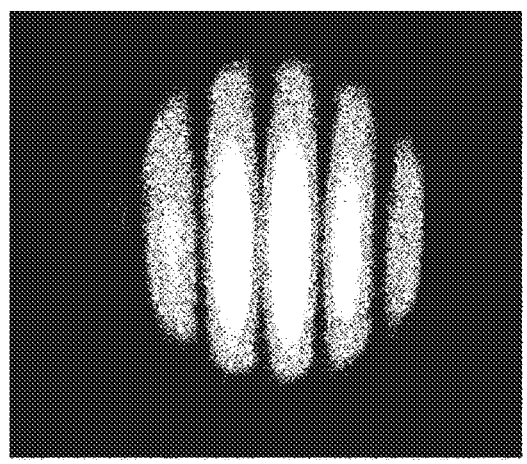
FIG. 13A is a resulting optical fringe plot from the Superluminescent fiber coupled diode in FIG. 13.

Additional sources were evaluated with embodiments of the invention. Results from these evaluations can be seen in FIGS. 12-17. From the evaluations, the embodiments of the invention performed better with single spatial modes versus multi-mode, due to local phase scrambling in the multimode. Although, while 100% conversion was not achieved in all cases, the embodiments of the invention produced significant improvements over contemporary systems. FIGS. 12, 13, and 13A show responses from a superluminescent (incoherent) diode coupled to embodiments of the invention via fiber (650 nm, 7 nm FWHM). This configuration, as seen in FIGS. 12 and 13 achieved 100% modulation depth and 100% conversion to linear polarization. FIG. 13A illustrates the optical fringes after the analyzer.

Figure 14:
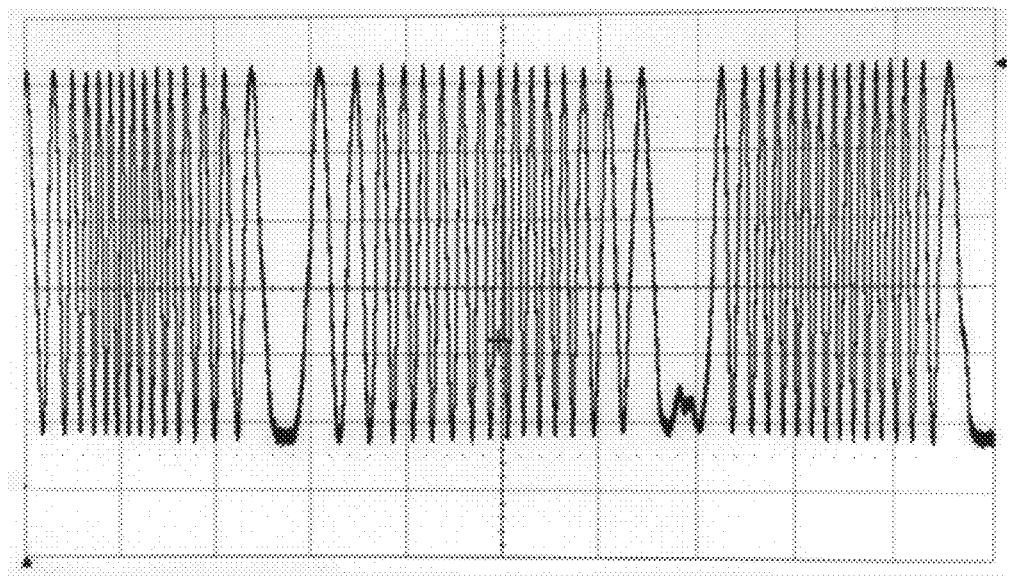
FIG. 14 is a screen reproduction of a response from a Superluminescent fiber coupled diode through single mode SM2000 optical fiber.
Figure 14A:
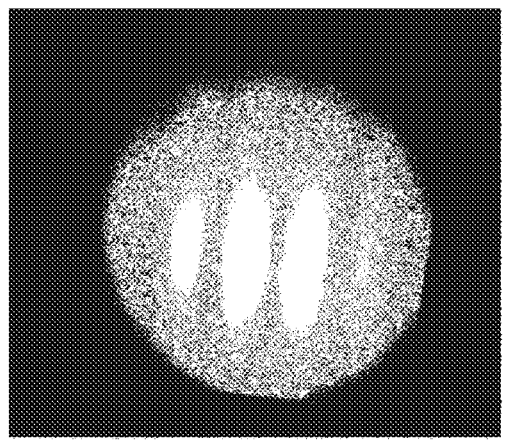
FIG. 14A is a resulting optical fringe plot from the Superluminescent fiber coupled diode through single mode SM2000 optical fiber of FIG. 14.

FIGS. 14 and 14A show results from a superluminescent (incoherent) fiber coupled diode through 50 m of single mode SM2000 optical fiber. As can be seen in FIG. 14, this configuration achieved 92% modulation depth with a 96% conversion to linear polarization. This represents 196% of the possible conversion using a simple polarizer. FIG. 14A illustrates the optical fringes after the analyzer for this configuration.

Figure 15:
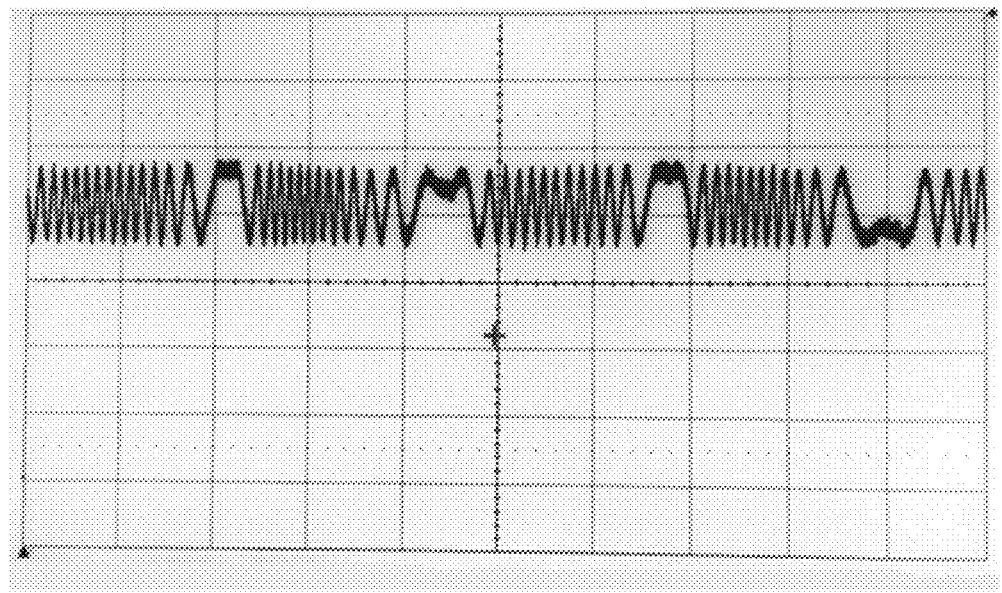
FIG. 15 is a screen reproduction of a response from a Superlimunescent fiber coupled diode through multimode optical fiber.
Figure 15A:
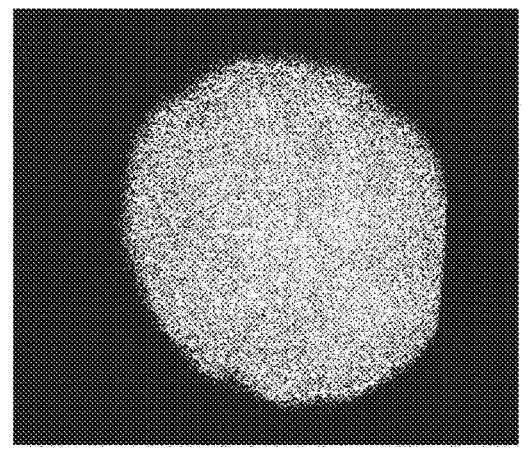
FIG. 15A is a resulting optical fringe plot from the Superlimunescent fiber coupled diode through multimode optical fiber of FIG. 15.

FIGS. 15 and 15A show results from a superluminscent (incoherent) fiber coupled diode through 50 m of 50 μm multimode optical fiber. As can be seen in FIG. 15, this configuration achieved 22% modulation depth with a 61% conversion to linear polarization. This represents 161% of the possible conversion using a simple polarizer. FIG. 15A illustrates the optical fringes after the analyzer for this configuration.

Figure 16:
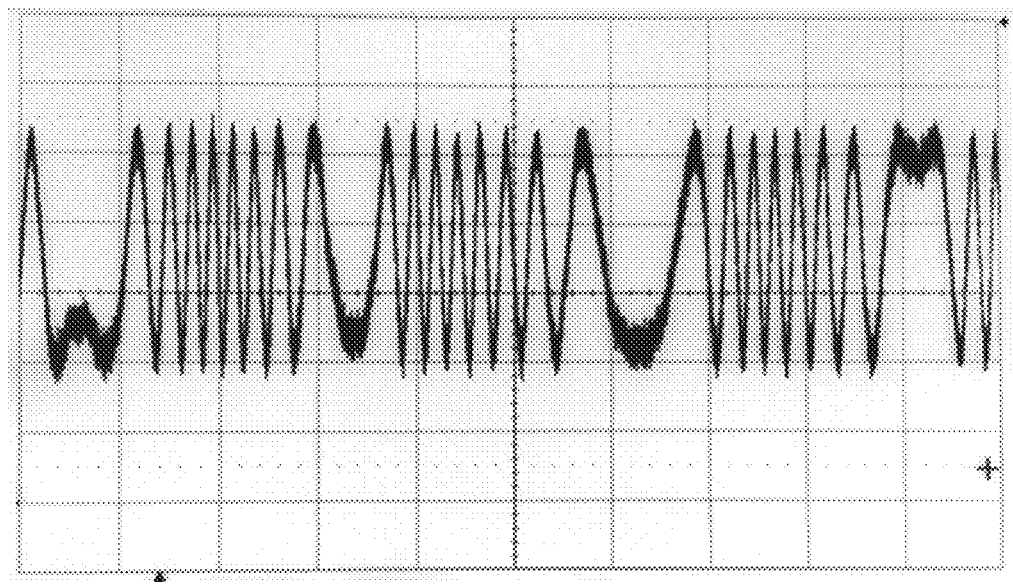
FIG. 16 is a screen reproduction of a response from a 10 W commercial Er fiber laser.
Figure 17:
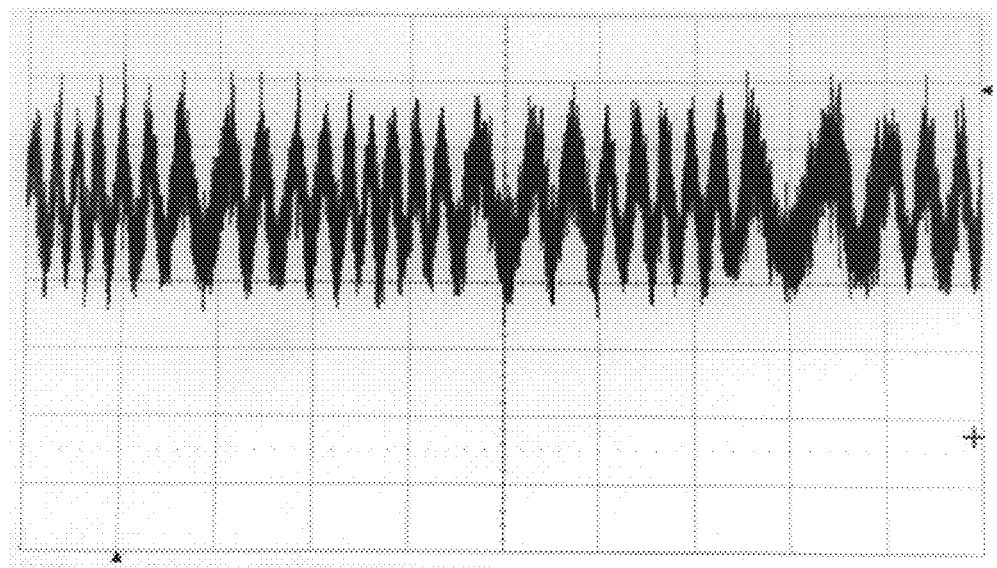
FIG. 17 is a screen reproduction of a response from a 120 W commercial Tm fiber laser.

FIG. 16 shows the results from a 10 W commercial Er fiber laser (1530 nm). As can be seen in the figure, this configuration achieved a 51% modulation depth with a 75.5% conversion to linear polarization. This represents 175% of possible conversion using a simple polarizer. Similarly, FIG. 17 shows the results from a 120 W commercial Tm fiber laser (1940 nm). As can be seen in this figure, the configuration achieved a 44% modulation depth with a 72% conversion to linear polarization. This represents 172% of possible conversion using a simple polarizer. While the results of the configurations in FIGS. 15-17 are significantly lower than the 100% or near 100% conversion of the configurations in FIGS. 10-14, there was still a significant increase in performance (>160% of possible conversion of a simple polarizer) by using embodiments of the invention.

The embodiments described above have been targeted towards optical devices. However, the design principals embodied here are universal, so that similar devices may be constructed for other wavebands. Polarization conversion with high efficiency would be extremely useful for RADAR and LIDAR devices, millimeter wave imaging, satellite communications, and for high efficiency antenna designs.

The technology has already been demonstrated for coherent light sources (lasers) and as such is already appropriate for use in any system that uses such light sources. A major challenge, however, will be to extend operation to broadband light sources (white light), so that complete polarization for all wavelengths is achieved simultaneously. This is possible and requires that there is no dispersion in either of the constituent beam paths. Unfortunately all optical materials have some dispersion and so the dispersive properties must be carefully tailored, in a similar manner that chromatic aberration is controlled in camera lenses. For the embodiments described above, dispersion correction is further complicated in that the phase difference must be the same for all wavelengths. Since the physical path lengths are fixed, dispersion must be controlled such that peak electric fields for all wavelengths are matched at the output waveplate. Without this condition, the polarization vector for each wavelength will be different. Of course, a wavelength dependent polarization vector might be useful for some applications (WDM, for example), but if this is not desired then careful control of the system dispersion will be needed. This is of added importance if this technology is to be extended to encompass a wide field of view.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A universal polarization converter comprising:
    a polarizer configured to receive unpolarized light, the polarizer further configured to split the received unpolarized light into a first polarized state and a second polarized state;
    at least two quarter wave phase retarders configured to convert each of the first and second polarized states to opposite handed polarized beams; and
    a cholesteric mirror configured to combine the opposite handed polarized beams.

2. The universal polarization converter of claim 1, further comprising:
    a first mirror configured to receive the second polarized state from the polarizer and further configured to reflect the second polarized state toward a second mirror;
    the second mirror configured to receive the reflected second polarized state and further configured to reflect the second polarized light toward the cholesteric mirror,
    wherein the first and second mirrors are positioned at a distance from the polarizer and cholesteric mirror respectively thereby changing an optical path length of the second polarized state.

3. The universal polarization converter of claim 2, further comprising:
    a drive element coupled to one of the first and second mirrors and configured to adjust the corresponding distance thereby changing the optical path length of the second polarized state.

4. The universal polarization converter of claim 3, wherein the drive element is a piezoelectric device.

* * * * *